United States Patent
Copeland et al.

(10) Patent No.: US 9,821,433 B2
(45) Date of Patent: Nov. 21, 2017

(54) PARTICLE SEPARATION ASSEMBLY FOR POWER TOOL

(71) Applicant: Black & Decker Inc., Newark, DE (US)

(72) Inventors: Earnest N. Copeland, Abingdon, MD (US); Robert J. Cirincione, II, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 14/717,168

(22) Filed: May 20, 2015

(65) Prior Publication Data

US 2015/0336238 A1    Nov. 26, 2015

Related U.S. Application Data

(60) Provisional application No. 62/000,768, filed on May 20, 2014.

(51) Int. Cl.
*B24B 55/10* (2006.01)
*B25F 5/00* (2006.01)
(Continued)

(52) U.S. Cl.
CPC ............ *B24B 55/102* (2013.01); *B01D 45/16* (2013.01); *B24B 23/028* (2013.01); *B24B 41/007* (2013.01); *B25F 5/008* (2013.01)

(58) Field of Classification Search
CPC ..... B25F 5/008; B24B 23/028; B24B 41/007; B24B 55/102; B01D 45/16
See application file for complete search history.

(56) References Cited

U.S. PATENT DOCUMENTS

| | | | |
|---|---|---|---|
| 2,661,810 A | 12/1953 | Heth | |
| 2,878,627 A * | 3/1959 | Morgan | A47L 9/104 451/453 |

(Continued)

FOREIGN PATENT DOCUMENTS

| | | |
|---|---|---|
| DE | 29622019 | 5/1998 |
| DE | 19914956 | 10/2000 |

(Continued)

OTHER PUBLICATIONS

Bosch GWS Angle Grinder User Manual, Dec. 2001.*

*Primary Examiner* — Marc Carlson
(74) *Attorney, Agent, or Firm* — Amir R. Rohani (57) ABSTRACT

A power tool is provided including a having a field case portion and a gear case portion, a motor disposed in the field case portion of the housing, a fan rotatably connected to the motor, intake conduits disposed along the housing, and a particle separation assembly in fluid communication with the intake conduits. The particle separation assembly includes a baffle and a centrifugal chamber, where the baffle is operable to direct airflow from the intake conduits into the centrifugal chamber in a cyclonic path, and the centrifugal chamber includes a radial gap forming a particle dispersion port in the cyclonic path of the airflow to eject contamination from the airflow. Additionally or alternatively, the centrifugal chamber includes air-directing fins arranged angularly to direct contamination from the airflow towards the particle dispersion port.

20 Claims, 11 Drawing Sheets (51) Int. Cl.
  *B24B 23/02*   (2006.01)
  *B01D 45/16*   (2006.01)
  *B24B 41/00*   (2006.01)

(56) References Cited

U.S. PATENT DOCUMENTS

| | | | | |
|---|---|---|---|---|
| 3,740,932 | A * | 6/1973 | Borsheim | B01D 45/12 55/394 |
| 3,973,937 | A | 8/1976 | Petersen et al. | |
| 4,197,102 | A * | 4/1980 | Decker | B01D 45/16 55/449 |
| 4,296,076 | A | 10/1981 | Swales et al. | |
| RE33,085 | E * | 10/1989 | Petersen | B01D 45/12 55/327 |
| 4,926,076 | A | 5/1990 | Nimura et al. | |
| 5,656,050 | A | 8/1997 | Moredock | |
| 5,752,688 | A | 5/1998 | Campbell et al. | |
| 6,161,627 | A * | 12/2000 | Seith | B25F 5/00 173/168 |
| 6,280,493 | B1 | 8/2001 | Eubank et al. | |
| 6,717,299 | B2 | 4/2004 | Bacile et al. | |
| 6,731,036 | B2 | 5/2004 | Ghiotto et al. | |
| 6,787,949 | B2 | 9/2004 | Bostwick et al. | |
| 6,878,189 | B2 * | 4/2005 | Moredock | B01D 45/16 55/345 |
| D522,334 | S | 6/2006 | Waldron | |
| 7,252,581 | B2 | 8/2007 | Numata et al. | |
| 7,258,713 | B2 * | 8/2007 | Eubank | F02M 35/022 55/401 |
| 8,113,922 | B2 * | 2/2012 | Esenwein | B24B 23/028 310/47 |
| 8,348,727 | B2 * | 1/2013 | Trautner | B24B 23/028 15/230.1 |
| 8,523,637 | B2 | 9/2013 | Loveless et al. | |
| 8,905,822 | B2 * | 12/2014 | Meyer | B24B 23/028 451/344 |
| 2011/0148227 | A1 * | 6/2011 | Schuele | B25F 5/008 310/50 |

FOREIGN PATENT DOCUMENTS

| | | | |
|---|---|---|---|
| DE | 29923577 | 1/2001 | |
| DE | 10161615 | 6/2003 | |
| DE | 102004063751 | 7/2006 | |
| DE | 102008041370 | 2/2010 | |
| EP | 1679156 | 7/2006 | |
| EP | 2113336 | 11/2009 | |
| EP | 2578357 | 4/2013 | |
| EP | 2689897 | 1/2014 | |
| JP | S5849066 | 3/1983 | |
| JP | WO 2013161444 A1 * | 10/2013 | B23Q 11/127 |

* cited by examiner

PARTICLE SEPARATION ASSEMBLY FOR POWER TOOL

CROSS-REFERENCE TO RELATED APPLICATION

This application claims the benefit of U.S. Provisional Patent Application 62/000,768 filed May 20, 2014, which is incorporated herein by reference in its entirety.

FIELD OF THE INVENTION

The present invention relates to a power tool, and more particularly to a particle separation assembly in a power tool.

BACKGROUND

The air intake streams of motorized devices such as vehicles, construction equipment, and powered tools often include particulate material. In power tool applications in particular, particulate material may include high concentrations of dust and debris from the workpiece. The particulate material, should it reach the internal operating mechanism, can cause substantial damage to the device. It is therefore beneficial to reduce the level of particulate material in the airflow at a point upstream from the operating mechanism (e.g., the motor or other equipment).

Dust extraction and ejection mechanisms are typically utilized to separate particulate material from the airstream. U.S. Pat. No. 8,348,727 assigned to Black & Decker Inc. discloses a power tool system in which a dust extraction system (i.e., a particle dispersion assembly) includes a baffle and a passive fan disposed to deflect particles from airflow. The baffle in that system includes angularly-positioned slats that direct the travel direction of the airflow angularly with respect to the passive fan. The airflow causes the passive fan blades to spin, which deflects the travel direction of the airflow in multiple directions to remove and disperse particles from the airflow. This arrangement is effective in separating dust and debris from airflow in tools such as large angle grinders. However, for smaller hand held power tools such as small angle grinders, the passive fan of the dust ejection system occupies too much space and requires too much girth be used effectively.

It would be desirable to provide an airflow arrangement in which the dust ejection system does not include a separate fan but still provides high efficiency dust extraction and ejection system.

SUMMARY

According to an embodiment, a power tool is provided including a having a field case portion and a gear case portion, a motor disposed in the field case portion of the housing, a gear set disposed in the gear case portion of the housing and operatively connected to the motor via a motor spindle, a fan rotatably connected to the motor, a plurality of intake conduits disposed along the housing, and a particle separation assembly in fluid communication with the plurality of intake conduits. In an embodiment, the particle separation assembly includes a baffle and a centrifugal chamber, where the baffle is operable to direct airflow from the intake conduits into the centrifugal chamber in a cyclonic path, and the centrifugal chamber includes a radial gap forming a particle dispersion port in the cyclonic path of the airflow to eject contamination from the airflow.

In an embodiment, the particle separation assembly includes an end cap having an inner surface with a substantially semi-spherical, semi-spherical with a frustum flat portion, or frusto-conical shape around the centrifugal chamber. In an embodiment, inner surface of the end cap includes a spiral portion having a radius that gradually increases to form the radial gap.

In an embodiment, the tool further includes a handle portion disposed between the field case portion and the particle separation assembly. In an embodiment, the end cap comprises an inwardly-projecting post projecting through the baffle to mate with the handle portion. In an embodiment, the handle portion comprises a plurality of spaced-apart fins arranged circumferentially around an end of the handle portion. In an embodiment, the end of the handle portion includes a sloped surface forming the plurality of intake conduits between the plurality of spaced-apart fins, and the baffle comprises an outer ring mounted on an end of the plurality of spaced-apart fins to receive the airflow through the plurality of intake conduits.

In an embodiment, the end cap comprises a plurality of air-directing fins on an inner surface thereof disposed angularly with respect to a center of the end cap to direct particles from the airflow towards an outer periphery of the centrifugal chamber.

In an embodiment, the baffle comprises a plurality of angular blades arranged to direct airflow from the intake conduits into the centrifugal chamber in a cyclonic path.

In an embodiment, the particle separation assembly is configured to separate contamination from the airflow at an efficiency rate of 40 to 60 percent.

In an embodiment, the particle separation assembly does not include a passive fan or a separate active fan different from the fan. In an embodiment, the power tool is a small angle grinder having a handle girth (circumference) of less than approximately 30 cm, preferably less than approximately 25 cm, more preferably less than approximately 20 cm.

According to an alternative or additional embodiment, a power tool is provided including a having a field case portion and a gear case portion, a motor disposed in the field case portion of the housing, a gear set disposed in the gear case portion of the housing and operatively connected to the motor via a motor spindle, a fan rotatably connected to the motor, a plurality of intake conduits disposed along the housing, and a particle separation assembly in fluid communication with the plurality of intake conduits. In an embodiment, the particle separation assembly includes a baffle and an end cap forming a centrifugal chamber, where the baffle is operable to direct airflow from the intake conduits into the centrifugal chamber in a cyclonic path, and an inner surface of the end cap includes a particle dispersion port and a plurality of air-directing fins arranged angularly to direct contamination from the airflow towards the particle dispersion port.

In an embodiment, the air-directing fins arranged angularly in the end cap improve the efficiency rate to 60 to 80 percent.

According to an alternative or additional embodiment, a power tool is provided including a having a field case portion and a gear case portion, a motor disposed in the field case portion of the housing, a gear set disposed in the gear case portion of the housing and operatively connected to the motor via a motor spindle, a fan rotatably connected to the motor, a plurality of intake conduits disposed along the housing, and a particle separation assembly in fluid communication with the plurality of intake conduits. In an embodiment, the particle separation assembly includes a baffle and an end cap having a substantially semi-spherical inner surface forming a centrifugal chamber and a particle dispersion port disposed on a peripheral portion of the centrifugal chamber. The baffle is operable to direct airflow from the intake conduits into the centrifugal chamber in a cyclonic path to dispense contamination from the airflow through the particle dispersion port.

FIG includes two handle halves 14a and 14b that mate together around the main portion 14c. Moreover, in an embodiment, the handle portion supports and/or partially forms a particle separation assembly 100, as discussed below in detail.

In an embodiment, the distance between the handle halves 14a and 14b and the main portion 14c provides sufficient room for air flow through the handle portion 14. In an embodiment, air flow generated by the fan 60 causes cooling air to enter through air intake conduits 102 and run through particle separation assembly 100. In an embodiment, particle separation assembly 100 reduces the amount of dust and debris in the cooling air to avoid contamination of the tool 10, particularly the motor 28. The air is then directed through the handle portion 14 too cool the switch 24 and associated components. Downstream from the switch 24, the air flows through the motor 28 in the field case 16 towards the fan 60. Hot air is repelled by the fan 60 through air outlets 42.

The particle separation assembly 100 of the invention is discussed herein, according to an embodiment. In an embodiment, the particle separation assembly 100 is arranged in the back of the power tool 10 at the back side of the handle portion 14. The particle separation assembly 100 includes a baffle 104 mounted on a mounting portion 70 of the handle portion 14 at the end of the handle portion 14. The particle separation assembly 100 also includes an end cap 106 disposed next to the baffle 104 opposite the handle portion 14. In an embodiment, a fastener 108 is further provided to secure the end cap 106 and the baffle 104 to a fastening receptacle 72 of the handle portion 14. In an embodiment, fastening receptacle 72 is arranged integrally on the back of the main portion 14c of the handle portion 14.

According to an embodiment, the mounting portion 70 of the handle portion 14 is formed by the ends of the handle halves 14a and 14b. The mounting portion 70 includes a plurality of spaced apart fins 110. When the baffle 104 is mounted on the handle portion 14, it, together with the fins 110 of the handle portion 14, defines the air intake conduits 102. In an embodiment, air intake conduits 102 are disposed circumferentially around the end portion of the handle portion 14 and allow air to enter from the vicinity of the handle portion 14 to the particle separation assembly 100. Cool air that enters through the air intake conduits 102 is directed by the baffle 104 in a cyclonic (i.e., circular) motion into the end cap 106, where dust and debris is separated from the cooling air. Air is then directed through a center of the baffle 104 into the handle portion 14.

Figure 7:
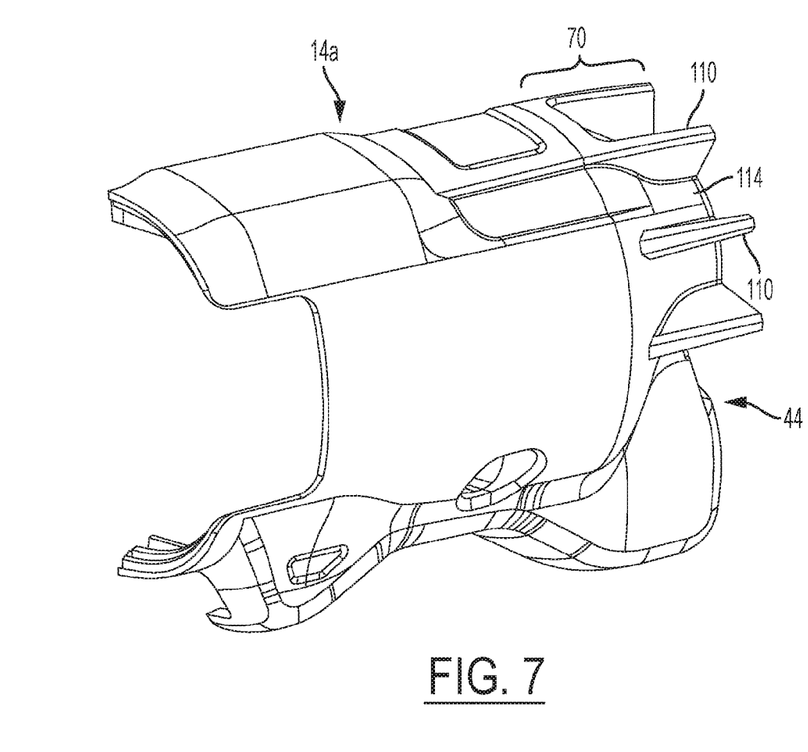
Figure 8A:
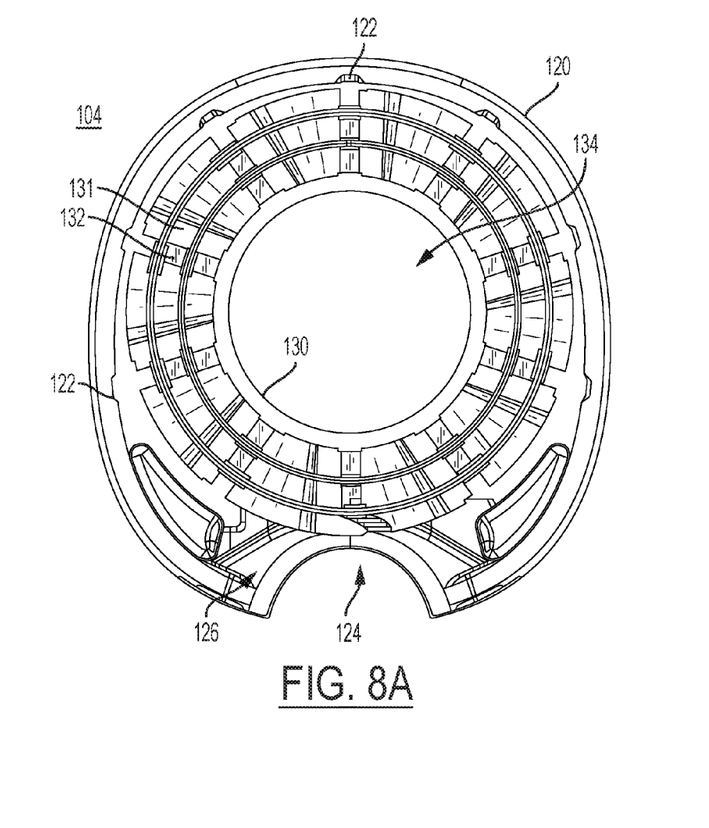
Figure 8B:
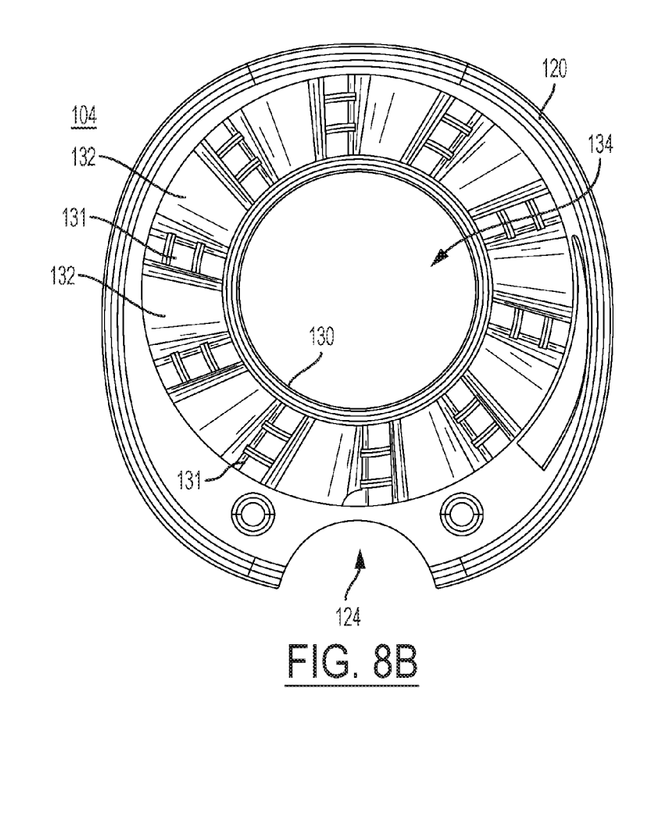
Figure 8C:
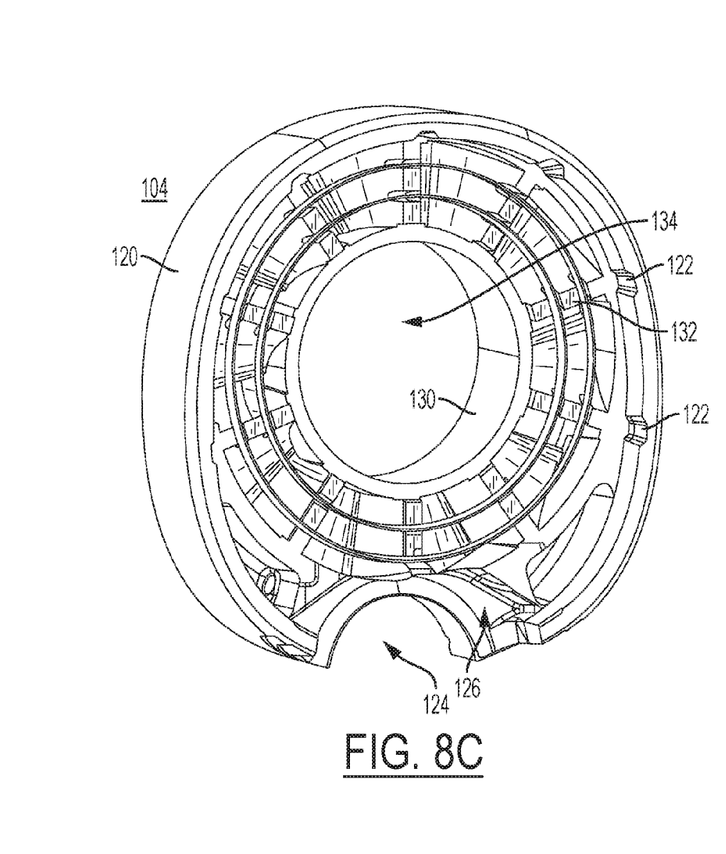
Figure 8D:
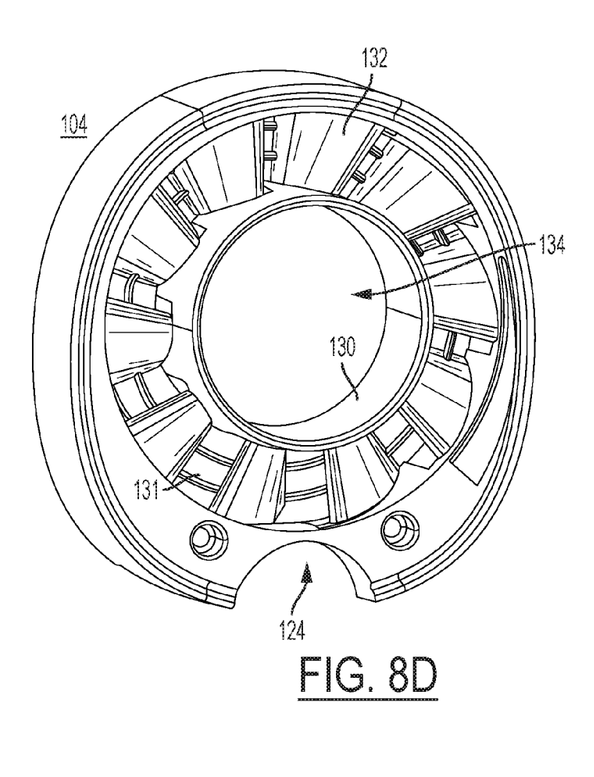
Figure 9A:
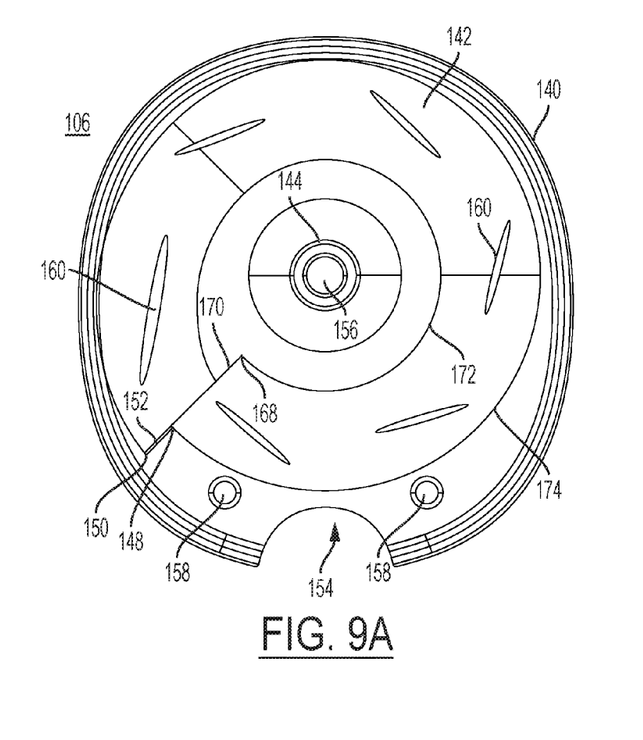
Figure 9B:
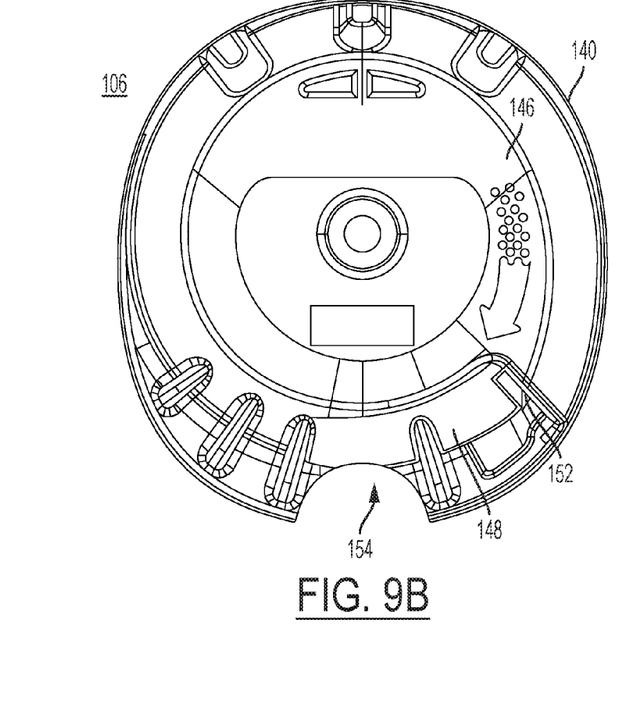
Figure 9C:
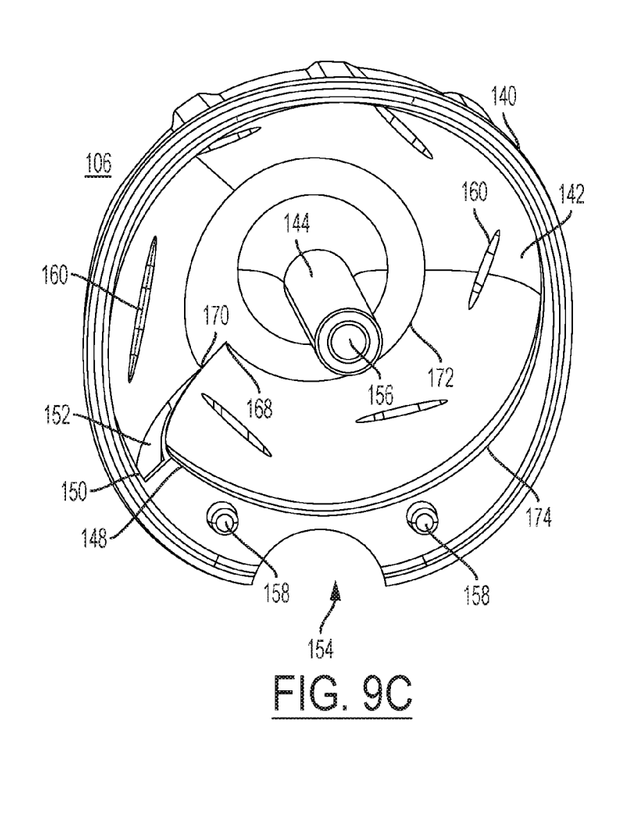
Figure 9D:
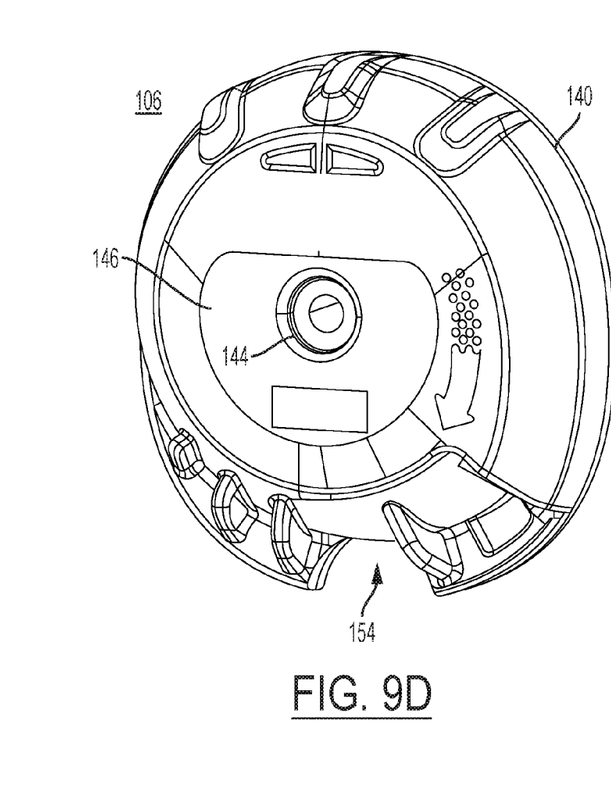

FIG. 7 depicts a perspective view of handle half 14a including the fins 110, according to an embodiment. In an embodiment, end portion 70 of the handle half 14a includes a sloped surface 114 arranged angularly with respect to a longitudinal surface of the handle half 14a. Fins 110 project from sloped surface 114 of the end portion 70 such that the outer edges of the fins 110 are in line with the longitudinal surface of the handle half 14a. In an embodiment, the handle halves 14a and 14b together form an aperture 44 for a power cable to be received by the tool 10.

FIGS. 8A-8D depict various front and back views of baffle 104, according to an embodiment. Baffle 104 includes an outer ring portion 120 that extends longitudinally to mate outer edges of fins 110 on the end portion 70 of the handle 14. In an embodiment, the outer ring portion 120 includes recesses 122 on its inner surface that receive portions of outer edges of fins 110 therein. The outer ring portion 120 and fins 110 of the end portion 70 of handle 14 together define air intake conduits 102. In an embodiment, the baffle 104 includes an opening 124 defined in the outer ring portion 120 include that mates with opening 44 of the handle 14 to receive the power cord. In an embodiment, alignment features 126 are provided around the opening 124 to properly mount the baffle 104 on the end portion 70 of the handle 14.

In an embodiment, the baffle 104 further includes an inner ring 130 and a plurality of blades 132 disposed between the inner and outer rings 120 and 130. The inside of the inner ring 130 defines an opening 134 for clean cooling air to enter the handle 14 from the particle separation assembly 100. Between the inner and outer rings 120 and 130, air channels 131 are formed between the respective blades 132. The blades 132 extend angularly with respect to a plane of the baffle 104 to redirect air that enters through the air intake conduits 102 in a circular cyclonical motion through the air channels 131, into the end cap 106. Blades 132, in an embodiment, may be arranged at a 30-60 degree angle with respect to the plane of the baffle 104.

FIGS. 9A-9D depict various views of the end cap 106, according to an embodiment. End cap 106, in this embodiment, includes a mating portion 140 arranged to mate with the outer ring 120 of the baffle 104 opposite the handle portion 14, and centrifugal chamber 142 formed by the mating portion 140 and a back portion 146. The centrifugal chamber 142, in an embodiment, is substantially semi-spherical, semi-spherical with a frustum flat portion, or frusto-conical shaped. In an embodiment, an inwardly-projecting post 144 is projecting from the back portion 146 in the middle of the centrifugal chamber 142 in an axial direction of the tool 10.

In an embodiment, an inner surface of the end cap 106 includes a small spiral around the centrifugal chamber 142 to form a particle dispersion port. In an embodiment, a radius of the inner surface of the end cap 106 gradually increases around the chamber 142 with respect to a center 156 of the post 144. Specifically, in an embodiment, inner surface of the end cap 106 includes a spiral portion defined between an inner boundary line 172 and outer boundary line 174, where the inner boundary line 172 spirals from an inner point 168 to an outer point 170 that is disposed farther from the center 156 than the inner point 168, and the outer boundary line 174 spirals from an inner point 148 to an outer point 150 that is disposed farther from the center 156 from the inner point 148. In an embodiment, the spiral shape of the inner and outer boundary lines 172 and 174 creates a radial gap therein that forms the particle dispersion port 152 in the end cap 106.

According to an embodiment, cooling air enters through intake conduits 102 and is directed in a cyclonic circular motion by baffle 104 into the end cap 106 around the post 144. In the end cap 106, as the cooling air circulates inside the centrifugal chamber 142 around the post 144, the dust and contamination in the air, due to its higher density, is centrifugally forced towards the outside perimeter of the centrifugal chamber 142. In an embodiment, the radial gap forming the particle dispersion port 152 is disposed on the cyclonic path of the air flow on the outside perimeter of the centrifugal chamber 142. As such, air with higher density of dust and contamination is forced out of the particle dispersion port 152 while clearer air with loser density of dust and contamination remains closer to the post 144. Cleaner air suctioned by the motor fan 60 through opening 134 of the baffle 104 into the handle portion 14 and the field case 16, where it cools the switch 24 and motor 28. In an embodiment, this arrangement results in separation and evacuation of dust and debris from cooling air at 40-60% efficiency.

According to a further embodiment of the invention, a plurality of air-directing fins (or stationary blades) 160 are provided on the inner surface of the centrifugal chamber 142. In an embodiment, fins 160 are formed integrally in the end cap 106 and are spaced apart around within the peripheral portion (defined between inner boundary line 172 and outer boundary line 174) of the centrifugal chamber 142. In an embodiment, the fins 160 are arranged at an angle with respect to the center 144 to direct dust and debris further towards the outer periphery (defined by outer boundary line 174) of the centrifugal chamber 142. In an embodiment, fins 160 improve efficiency of dust and debris separation and evacuation to 60-80%.

Figure 1:
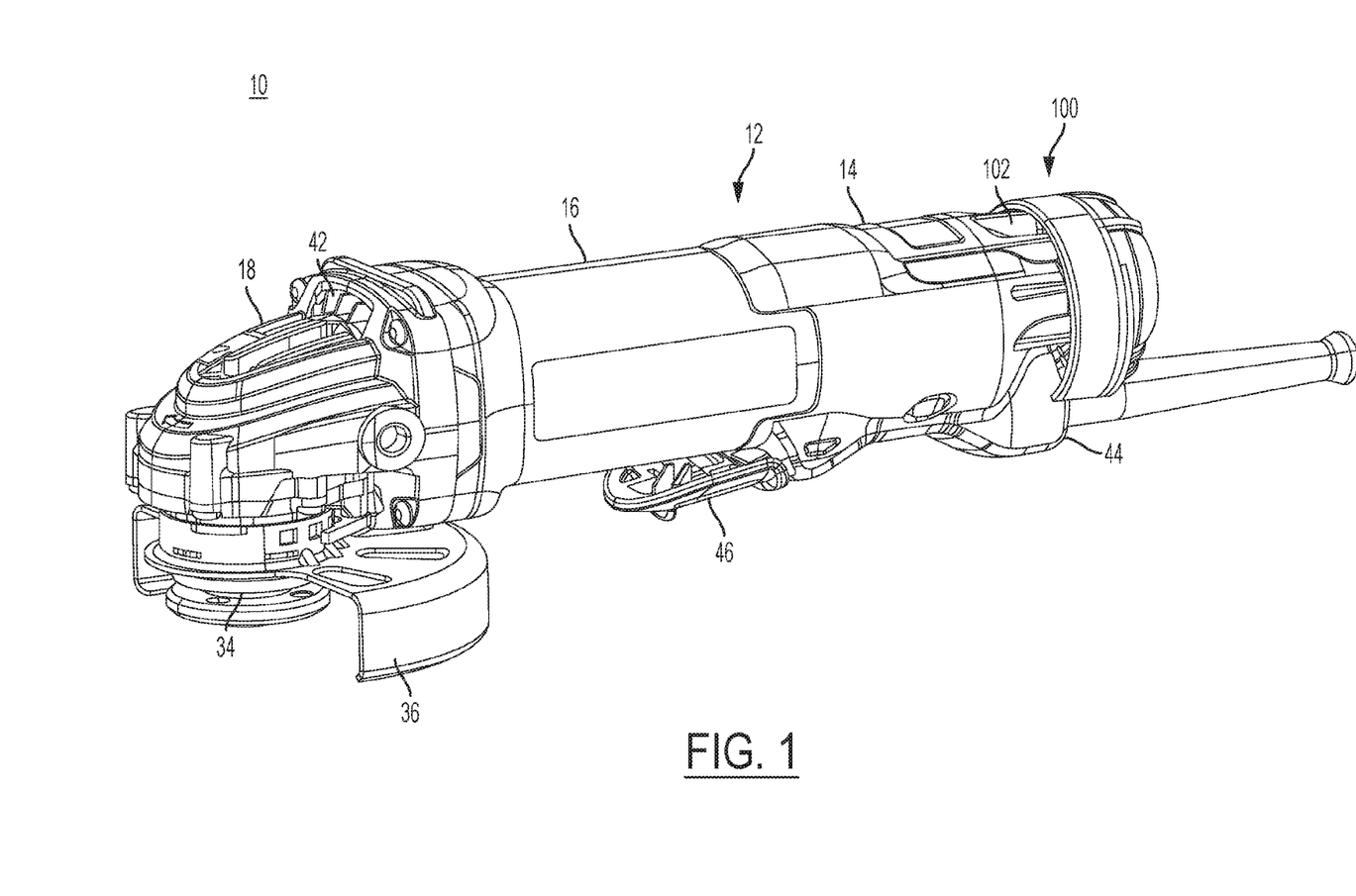
FIG. 1 depicts a perspective view of an angle grinder, according to an embodiment.
Figure 2:
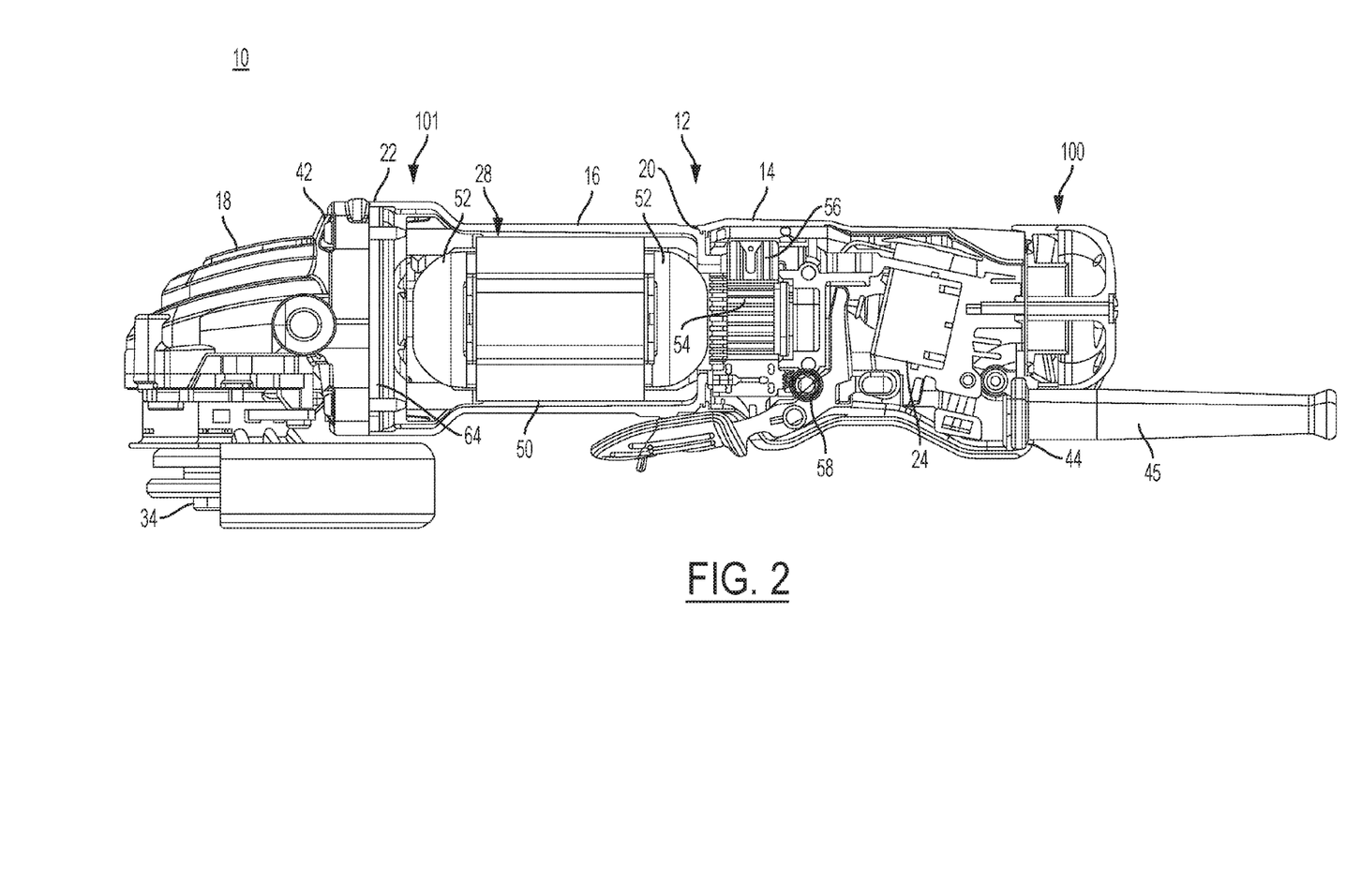
FIG. 2 depicts a side view of the angle grinder with a grinder housing partially remove, according to an embodiment.
Figure 3A:
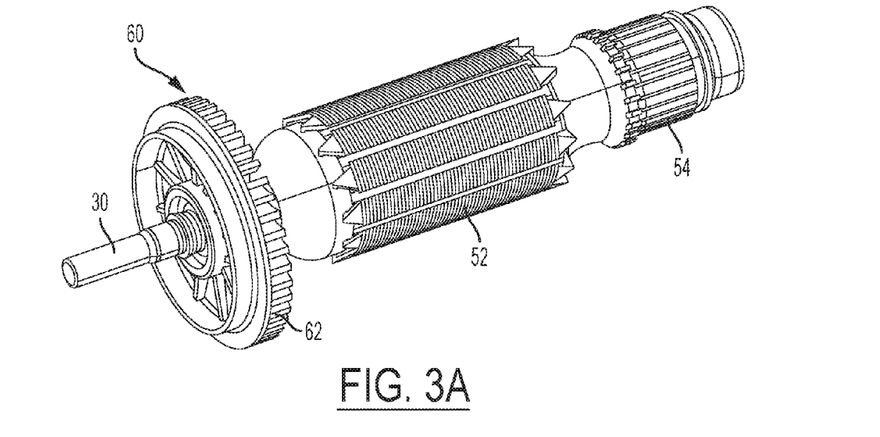
Figure 3B:
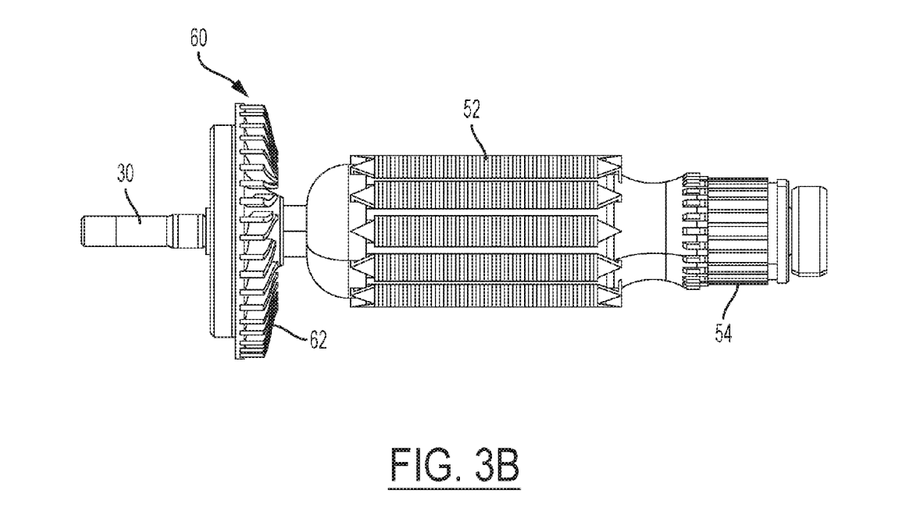
Figure 4:
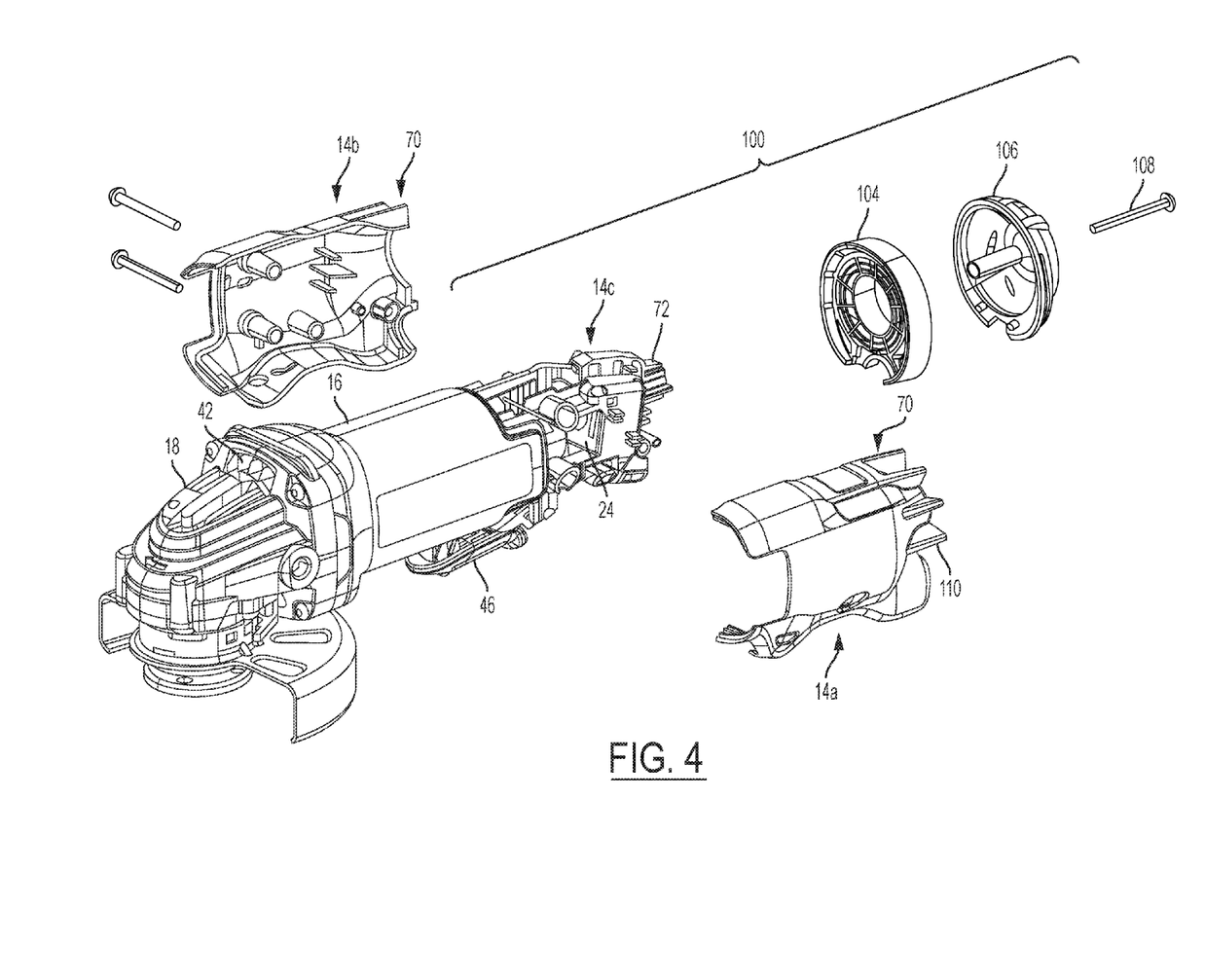
Figure 5:
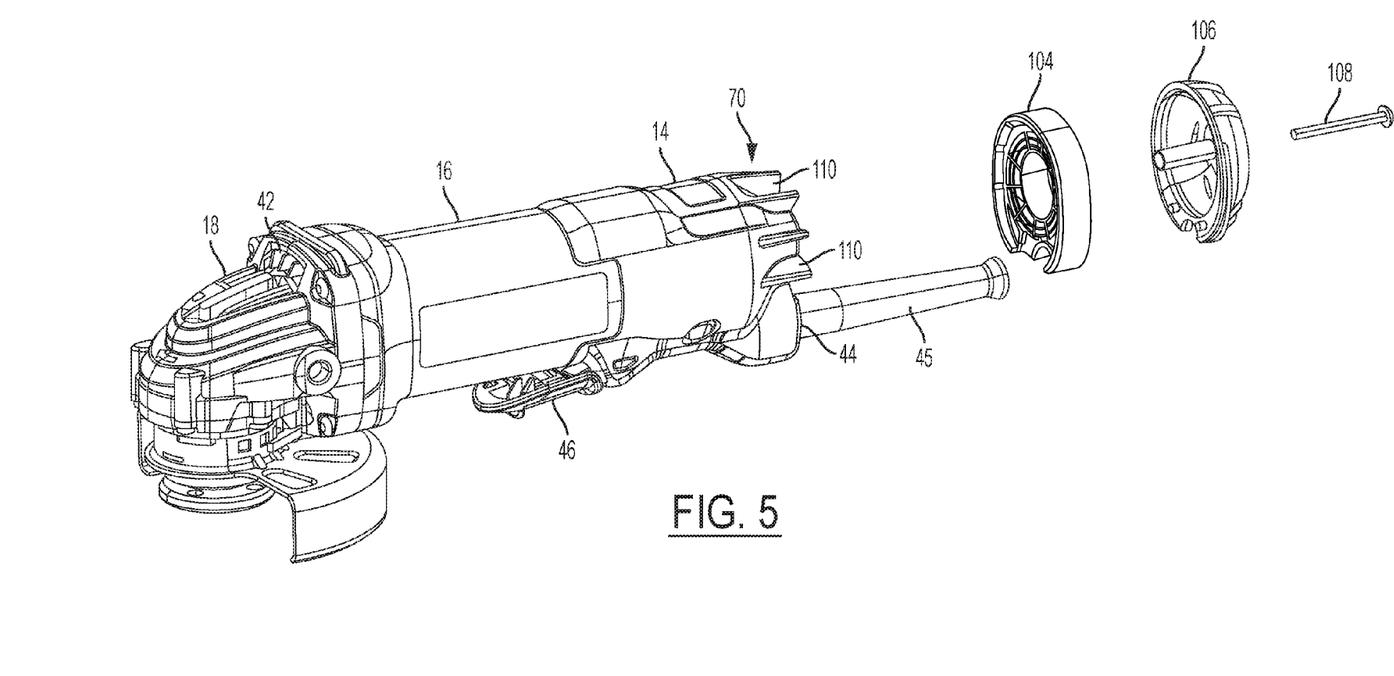
Figure 6:
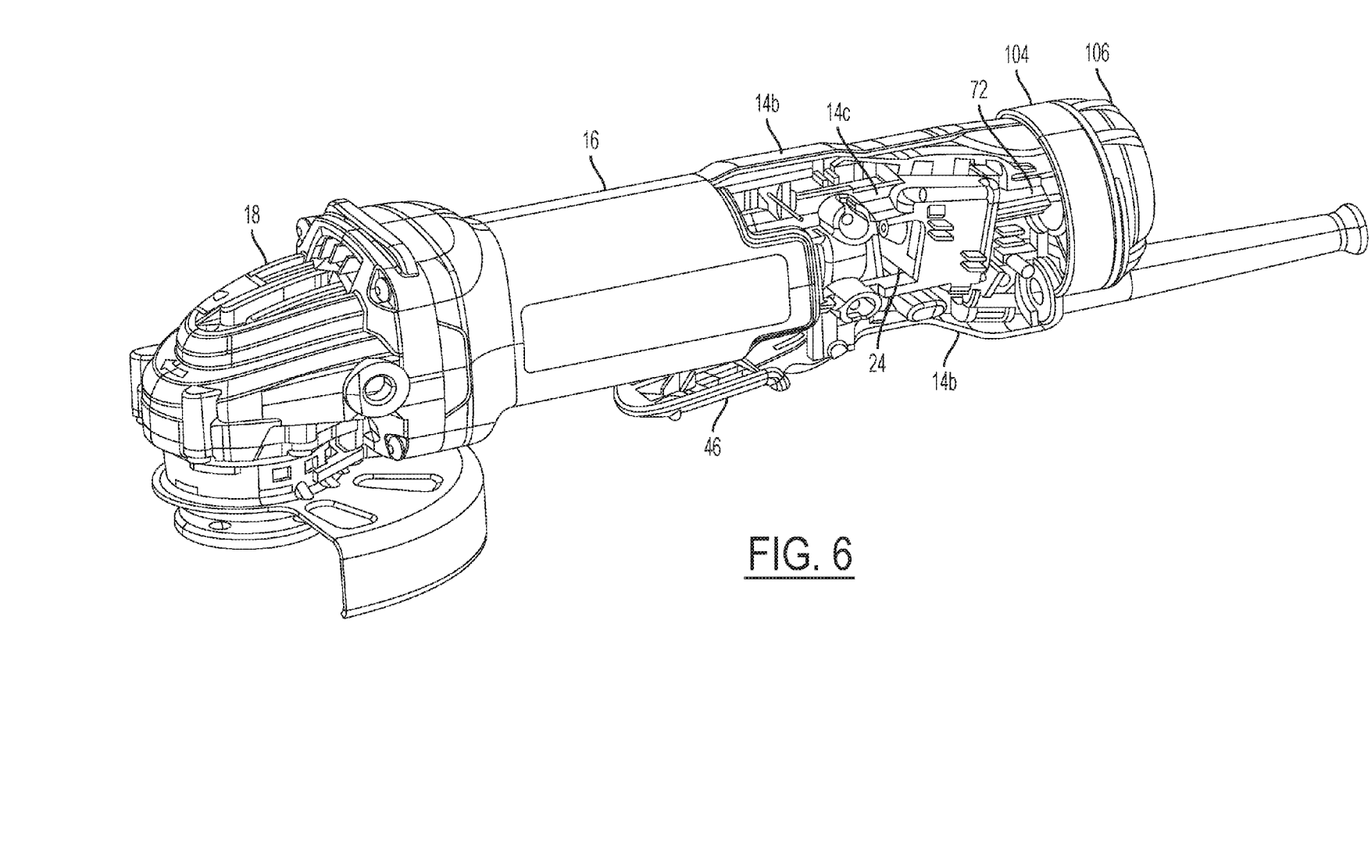

According to an embodiment, as shown in FIG. 4, during assembly, post 144 of the end cap 140 penetrates through opening 134 of the baffle 120 and mates with fastener receptacle 72 of the handle 14. In an embodiment, an opening 154 is provided in the end cap 106 that mates with opening 124 of the baffle 104 and opening 44 of the handle 14 to receive the power cord. In an embodiment, alignment features 158 are further provided to properly align the end cap 106 with the baffle 104. In an embodiment, a fastening means 108 (such as a screw) is inserted though the post 144 and fastened into the fastening receptacle 72. This arrangement securely forms the particle separation assembly 100 in the back of the handle 14.

In an embodiment, this arrangement is particularly suitable for small angle grinders or other tools having a small handle girth, where a passive fan cannot be efficiently fitted into a handle 14. In an embodiment, the handle 15 has a girth (circumference) of less than approximately 30 cm, preferably less than approximately 25 cm, more preferably less than approximately 20 cm.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The invention claimed is:

1. A power tool comprising:
a housing including a field case portion and a gear case portion;
a motor disposed in the field case portion of the housing, the motor having a longitudinal axis;
a gear set disposed in the gear case portion of the housing and operatively connected to the motor via a motor spindle;
a fan rotatably connected to the motor;
a plurality of intake conduits disposed along the housing; and
a particle separation assembly in fluid communication with the plurality of intake conduits and including a baffle and a centrifugal chamber, wherein the baffle includes a plane being substantially perpendicular to the longitudinal axis of the motor, the baffle comprising a plurality of blades that extend angularly with respect to the plane of the baffle and are operable to direct airflow from the intake conduits into the centrifugal chamber in a cyclonic path, and wherein the centrifugal chamber is defined by an inner surface, the inner surface following a substantially spiral path outwardly about the longitudinal axis from an inner edge to an outer edge that is radially offset from the inner edge to form a particle dispersion port in the cyclonic path of the airflow, wherein contamination is substantially separated from the airflow within the centrifugal chamber and ejected from the centrifugal chamber through the particle dispersion port.

2. The power tool of claim 1, wherein the particle separation assembly includes an end cap.

3. The power tool of claim 2, wherein the end cap includes an inner surface having a substantially semi-spherical, semi-spherical with a frustum flat portion, or frusto-conical shape around the centrifugal chamber.

4. The power tool of claim 3, wherein the inner surface of the end cap includes a spiral portion having a radius that gradually increases to form the particle dispersion port.

5. The power tool of claim 2, further comprising a handle portion disposed between the field case portion and the particle separation assembly.

6. The power tool of claim 5, wherein the end cap comprises an inwardly-projecting post projecting through the baffle to mate with the handle portion.

7. The power tool of claim 5, wherein the handle portion comprises a plurality of spaced-apart fins arranged circumferentially around an end of the handle portion.

8. The power tool of claim 7, wherein the end of the handle portion includes a sloped surface forming the plurality of intake conduits between the plurality of spaced-apart fins, and the baffle comprises an outer ring mounted on an end of the plurality of spaced-apart fins to receive the airflow through the plurality of intake conduits.

9. The power tool of claim 2, wherein the end cap comprises a plurality of air-directing fins on an inner surface thereof disposed angularly with respect to a center of the end cap to direct particles from the airflow towards an outer periphery of the centrifugal chamber.

10. The power tool of claim 1, wherein the particle separation assembly does not include a passive fan or a separate active fan different from the fan.

11. A power tool comprising:
a housing including a field case portion and a gear case portion;
a motor disposed in the field case portion of the housing;
a gear set disposed in the gear case portion of the housing and operatively connected to the motor via a motor spindle;
a fan rotatably connected to the motor;
a plurality of intake conduits disposed along the housing; and
a particle separation assembly in fluid communication with the plurality of intake conduits and including a baffle and an end cap forming a centrifugal chamber, wherein the baffle includes a plurality of angular blades operable to direct airflow from the intake conduits into the centrifugal chamber in a cyclonic path, and an inner surface of the end cap includes a particle dispersion port at or near a periphery of the centrifugal chamber and at least one air-directing fin arranged angularly with respect to a center of the end cap to direct contamination from the airflow towards the particle dispersion port.

12. The power tool of claim 11, wherein the inner surface of the end cap includes a substantially semi-spherical, semi-spherical with a frustum flat portion, or frusto-conical shape around the centrifugal chamber.

13. The power tool of claim 11, wherein the inner surface of the end cap includes a spiral portion having a radius that gradually increases to form a radial gap for the particle dispersion port.

14. The power tool of claim 11, further comprising a handle portion disposed between the field case portion and the particle separation assembly.

15. The power tool of claim 14, wherein the end cap comprises an inwardly-projecting post projecting through the baffle to mate with the handle portion.

16. The power tool of claim 14, wherein the handle portion comprises a plurality of spaced-apart fins arranged circumferentially around an end of the handle portion.

17. The power tool of claim 16, wherein the end of the handle portion includes a sloped surface forming the plurality of intake conduits between the plurality of spaced-apart fins, and the baffle comprises an outer ring mounted on an end of the plurality of spaced-apart fins to receive the airflow through the plurality of intake conduits.

18. The power tool of claim 11, wherein the particle separation assembly does not include a passive fan or a separate active fan different from the fan.

19. The power tool of claim 11, wherein the power tool is a grinder having a handle girth of less than approximately 25 cm.

20. A power tool comprising:
a housing including a field case portion and a gear case portion;
a motor disposed in the field case portion of the housing, the motor having a longitudinal axis;
a gear set disposed in the gear case portion of the housing and operatively connected to the motor via a motor spindle;
a fan rotatably connected to the motor;
a plurality of intake conduits disposed along the housing; and
a particle separation assembly in fluid communication with the plurality of intake conduits and including a baffle having a plane extending radially from the longitudinal axis of the motor, and an end cap having a substantially semi-spherical inner surface forming a centrifugal chamber and a particle dispersion port disposed on a peripheral portion of the centrifugal chamber, wherein the baffle includes a plurality of blades that extend angularly with respect to the plane of the baffle and are operable to direct airflow from the intake conduits into the centrifugal chamber in a cyclonic path to dispense contamination from the airflow through the particle dispersion port, and wherein an inner surface of the end cap includes a spiral portion having a radius that gradually increases from an inner point to an outer point that is disposed farther from an axial center of the end cap than the inner point, the particle dispersion port being formed as a radial gap between the inner point and the outer point.

* * * * *